United States Patent [19]
Kita

[11] Patent Number: 5,278,237
[45] Date of Patent: Jan. 11, 1994

[54] SCULPTURING RESIN COMPOSITION AND PROCESS FOR SCULPTURING A SCULPTURED PRODUCT

[75] Inventor: Masami Kita, Kobe, Japan

[73] Assignee: DAICEL-Huls Ltd., Tokyo, Japan

[21] Appl. No.: 925,741

[22] Filed: Aug. 7, 1992

[30] Foreign Application Priority Data

Aug. 9, 1991 [JP] Japan .................. 3-200326

[51] Int. Cl.⁵ .............. C08L 33/08; C08L 33/10; C08L 35/00
[52] U.S. Cl. .................. 525/207; 525/74; 525/75; 525/78; 525/88; 525/216; 524/432; 524/517
[58] Field of Search ............ 525/74, 78, 75, 88, 525/207, 216; 524/432, 517

[56] References Cited

U.S. PATENT DOCUMENTS

| | | |
|---|---|---|
| 3,846,365 | 11/1974 | Berg et al. . |
| 3,921,333 | 11/1975 | Clendinning et al. . |
| 4,042,648 | 8/1977 | Kitamura et al. .............. 525/216 |
| 4,153,772 | 5/1979 | Schwesig et al. . |
| 4,183,876 | 1/1980 | Coran et al. . |
| 4,360,071 | 6/1982 | Schnorrer . |
| 4,454,287 | 6/1984 | Liu . |

FOREIGN PATENT DOCUMENTS

| | | |
|---|---|---|
| 435780A2 | 7/1991 | European Pat. Off. . |
| 61-42679 | 3/1986 | Japan . |
| 63-145325 | 6/1988 | Japan . |
| 1-113457 | 5/1989 | Japan . |
| 1-196090 | 8/1989 | Japan . |
| 1-213353 | 8/1989 | Japan . |

OTHER PUBLICATIONS

*Kautschuk + Gummi Kunststoffe*, 34, Jahrgang, Nr., "trans-Polyoctenamer", Mar. 1981, pp. 185-190.

*Primary Examiner*—Vasu S. Jagannathan
*Attorney, Agent, or Firm*—Sughrue, Mion, Zinn, Macpeak & Seas

[57] ABSTRACT

Disclosed are a sculpturing resin composition which comprise comprising a polyoctenamer resin and a polyolefin copolymer and/or a modified polyolefin resin, and a process for sculpturing a sculptured product.

The sculpturing composition has an excellent property of not shrinking even after elapse a long period of time, and is capable of being molded by hand at moderate temperatures, sculptured or shaved with a chisel, etc., and also being polished or ground with a rasp, etc., in comparison with conventional sculpturing materials.

The anti-shrinking property of the polyoctenamer resin is found to be improved specifically by the mixing with a polyolefin copolymer and/or a modified polyolefin resin.

14 Claims, 2 Drawing Sheets

SCULPTURING RESIN COMPOSITION AND PROCESS FOR SCULPTURING A SCULPTURED PRODUCT

FIELD OF THE INVENTION

The present invention relates to a sculpturing resin composition which comprises a polyoctenamer resin and a polyolefin copolymer and/or a modified polyolefin resin, and a process for sculpturing a sculptured product which comprises using the resin composition.

The sculpturing resin composition has an excellent property of not shrinking even after elapse a long period of time, and which is capable of being molded by hands at moderate temperatures, sculptured or shaved with a chisel, etc., and also being polished or ground with a rasp, sand paper, etc., in comparison with conventional sculpturing resin compositions.

BACKGROUND OF THE INVENTION

Heretofore, materials for modeling and/or sculpturing comprising clays for the manual production of plastic representations or sculptures or the like of all types, for example, a plaster of Paris, an oil-based clay such as Plasticine [e.g., see U.S. Pat. No. 3,558,340, Japanese Unexamined Patend Publication (Kokai) No. 53436/1977, No. 36324/1979], an oil-based wheat flour [e.g., see Japanese Unexamined Patent Publication (Kokai) No. 111128/1976, No. 533/1977], a mixture of wood powder, hydrocarbon oil and rubber-reinforced styrene resin (e.g., see U.S. Pat. No. 4,624,976), a mixture of crushed paper or pulp and binding material (ex. Japanese Unexamined Patent Publication (Kokai) No.1117/1975, No.38427/1978), a mixture of synthesized latex, starch and bread powder (e.g., see U.S. Pat. No. 4,172,054), a mixture of polyvinyl alcohol powder and polyhydric alcohol (e.g., see Japanese Unexamined Patent Publication (Kokai) No.125446/1976), and the like, have been widely known.

The above-mentioned materials for modeling and/or sculpturing have been widely used by professional sculptors, artists, non-professional hobbyist including students or children and other workers as pliable materials.

Of the above-mentioned prior arts, for example, U.S. Pat. No. 3,558,340 discloses a process of coating an object of oil or wax-based modeling clay which comprises several steps.

On the other hand, U.S. Pat. No. 3,883,456 discloses a modeling compound which comprises polyvinyl chloride powder and alkyl polyglycol ether and kaolin, and the like.

Furthermore, U.S. Pat. No. 4,336,071 discloses a plastic compound which is deformable by hand and serves for the production of models, motifs and other kinds of plastic representations.

The plastic compound for modeling is constituted of binding agents such as polyvinyl chloride or cellulose ether or ceresin wax, plasticizers and/or solvents, as well as fillers such as aluminum hydroxide.

The above-mentioned compounds can be molded with dies or by hands, and be sculptured with a chisel or a boaster and also be polished by a rasp or a sandpaper.

However, the above-mentioned compounds have many problems and disadvantages, as described hereinafter.

For example, the compounds typically cannot be used repeatedly, and, for example, a piece of work or product in a partially broken situation cannot be repaired or reformed, that is, a change from the softened state to the solidified state is typically irreversible.

Furthermore, fine hair cracks in a piece of work or product tend to occur over a long period after solidification.

Also, thin or fine parts cannot be formed without many difficulties because of weakness of flexural strength and/or self-supporting ability.

Furthermore, there is caused a problem of dusting while handling, and generally there is a requirement of a long time for drying or solidification.

Still further, there is also a disadvantage of difficulty in painting with colored paint brightly or clearly, because of a typical lack of smoothness or the above-mentioned fine hair cracks of the surface.

Additionally, it is difficult for such piece of work or product to be colored clearly by blending pigments or dyes.

For the purpose of overcoming the above disadvantages, recently, various kinds of resins have been used.

The examples include epoxy resins, polyurethane resins, acrylic resins, and polycaprolactones.

Of the above-mentioned resins, however, epoxy resins and polyurethane resins can be used only in special uses, because of resins having irreversible hardenability.

Acrylic resins can be only sculptured or shaved in addition to its high softening temperatures; accordingly, the application scope is disadvantageously limited.

On the other hand, a lactone resin such as a polycaprolactone resin, which is a thermoplastic resin, can be softened at temperatures of approximately 60° to 80° C., so that the lactone resins have recently been used as a resin for modeling compound.

For example, the polycaprolactone resin for kneading and modeling compound was disclosed in Japanese Unexamined Patent Publication (Kokai) No. 42679/1986 [entitled "The Use of a Resin for Modeling Compound"].

Furthermore, Japanese Unexamined Patent Publication (Kokai) No. 113457/1989 [entitled "A Resin Composition and The Use of a Resin for Modeling Compound"] and Japanese Unexamined Patent Publication (Kokai) No. 213353/1989 [entitled "The Use of a Resin for Modeling Compound"] disclose that the thermoplastic polycaprolactone is mixed with a chlorinated polyethylene or a chlorinated paraffin for the purpose of delaying the time to be solidified from the state of being softened.

Still further, Japanese Unexamined Patent Publication (Kokai) No. 196090/1989 [entitled "The Use of a Resin for Modeling Compound"] disclose that the thermoplastic polycaprolactone is mixed with a polycarbonate resin for the purpose of lowering softening temperatures.

However, the caprolactone resin cannot be sculptured or shaved with a chisel or a boaster, etc., and cannot be polished with a rasp or a sandpaper because of its hardness and fine splits in spite of its moderate softening temperatures (that is, modeling temperatures) and other excellent properties.

Japanese Unexamined Patent Publication (Kokai) No. 255151/1990 [corresponding to the U.S. patent application Ser. No. 635,721: entitled "The Material for Modeling and/or Sculpturing"] discloses that there is used a thermoplastic polyoctenamer resin mixed with an inorganic filler for the purpose of improving the ease of sculpturing, shaving and polishing with a rasp or a sandpaper, etc., without loss of its moderate softening temperatures, that is, modeling temperatures and other excellent properties.

The composition for a sculpturing material has a disadvantage of shrinking after elapse of a long period of time.

SUMMARY OF THE INVENTION

The present invention has been found as a result of intensive studies in order to develop a material having anti-shrinking property without loss of capability of sculpturing in addition to a capability of modeling at moderate temperatures.

It is a primary object of the present invention to solve the problem of the shrinking property of polyoctenamer resin composition, and to provide a process for manufacturing a sculpturing resin composition having anti-shrinking property without loss of capability of molding by hand at moderate temperatures, and sculpturing or shaving with a chisel or a boaster, etc., and even polishing with a rasp or a sandpaper, etc.

As a result, according to this invention, it has now been found that it is possible to solve the problem as noted hereinabove by the use of a polyoctenamer resin composition mixed with a polyolefin copolymer and/or a modified polyolefin resin.

Therefore, in accordance with the present invention, there is provided a sculpturing composition comprising a resin composition containing a polyoctenamer resin and a polyolefin copolymer and/or a modified polyolefin resin.

Furthermore, according to another aspect of the present invention, there is provided a process for manufacturing a sculptured product comprising sculpturing a sculpturing composition comprising a resin composition containing a polyoctenamer resin and a polyolefin copolymer and/or a modified polyolefin resin.

DETAILED DESCRIPTION OF THE INVENTION

Figure 1:
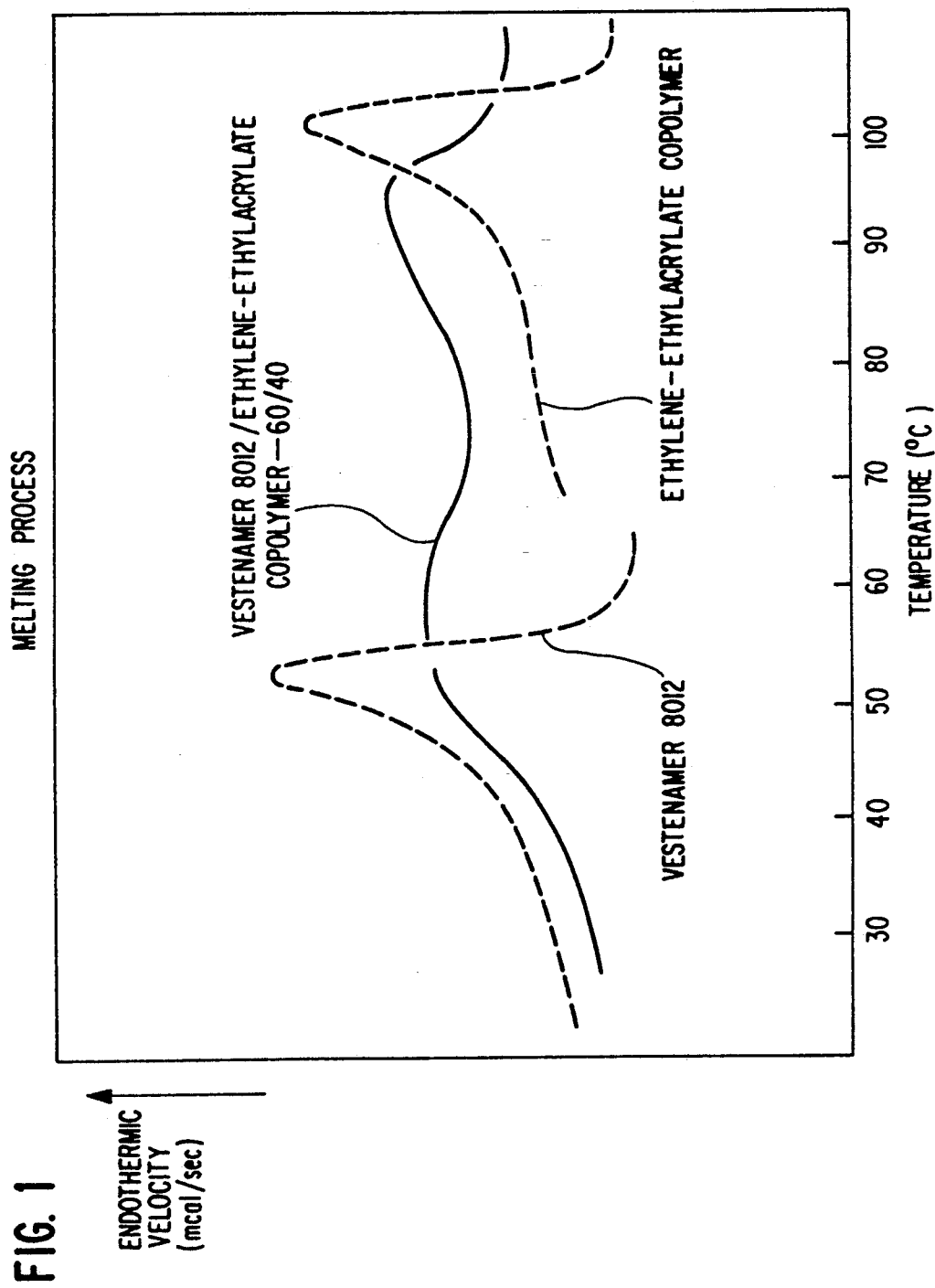
FIG. 1 is a chart obtained in measurements with a differential scanning calorimeter (DSC), in which the endothermic curves of melting processes (Perkin-Elmer type curves) are illustrated with regard to a resin composition composed of polyoctenamer resin and ethylene-ethylacrylate copolymer in a mixing ratio of 60/40, a polyoctenamer resin and an ethylene-ethylacrylate copolymer, respectively.

The present invention will be described hereinafter in more detail.

A polyoctenamer resin can typically be prepared by a polymerization of cyclooctene, in which one double bond is located between two units of recurring 8 methylene groups, and the molecular weight is more than 10,000.

A preferable scope of molecular weight of the resin in the present invention preferably is from 10,000 to 150,000, and more preferably 80,000 to 120,000.

Where the molecular weight is less than 10,000, the resin is too low in mechanical strength.

On the other hand, where the molecular weight is more than 150,000, the resin is more difficult to sculpture or shave with a chisel, etc.

The molecular weight of the polyoctenamer resin can be adjusted by controlling a combination of polymerization temperatures and periods.

Polymerization temperatures range is from $-20°$ to $80°$ C.

For example, higher polymerization temperatures and long polymerization periods would provide polymers having lower molecular weight.

Thereby, the melting temperatures can be readily adjusted.

The above molecular weight is based on measurements with Gel Permeation Chromatography.

Furthermore, the degree of crystallinity is preferably more than 5%, and more preferably more than 10%.

Such polyoctenamer resins have glass transition temperature of $-80°$ C. to $-30°$ C., and melting temperatures of $5°$ to $80°$ C.

Accordingly, such polyoctenamer resin is very suitable as a material for sculpturing.

Cyclooctene, which is a raw material of the polyoctenamer resin, can be prepared, for example, by dimerization of 1,3-butadiene via 1,5-cyclooctadiene having two double bonds remained, followed by hydrogenation reaction to one double bond of the two, which is one of various kinds of manufacturing methods.

The polyoctenamer resin can be prepared by a polymerization of cyclooctene, for example, by a metathesis polymerization method, which is one of various kinds of the manufacturing methods.

By choosing appropriate polymerization conditions it is possible to control the trans-cis ratio of the double bonds, and thus the degree of crystallinity of the polyoctenamers.

In general, a greater crystallinity and consequently a higher melting point is obtained with increasing trans-content.

Thereby, the degree of crystallinity can be readily adjusted.

It is noted, for example, that a resin having a trans-content of approximately 80% and molecular weight of 100,000 (Vestenamer 8012, a product of Huels, AG) has a melting point of approximately $54°$ C., the resin having a trans-content of approximately 60% (Vestenamer 6213, a product of Huels, AG) has a melting point of $30°$ C.

It is noted that Vestenamer 8012 and Vestenamer 6213 have various properties shown in the table described below.

| | Vestenamer 6213/ Vestenamer 8012 |
|---|---|
| MOLECULAR WEIGHT, MW (GPC): | 120,000/100,000 |
| MELTING POINT (DSC): | 33° C./<54° C. |
| GLASS TRANSITION TEMPERATURE: | −75° C./−65° C. |
| DENSITY AT 20° C. (G/ML): | 0.89/0.91 |
| APPARENT DENSITY (G/ML): | 0.46/0.53 |
| CRYSTALLINITY AT 23° C.: | 10%/27% |
| MOONEY VISCOSITY (ML) AT 100° C.: | <10/<10 |
| TRANS/CIS RATIO | APPROX. |

|  | Vestenamer 6213/ Vestenamer 8012 |
|---|---|
| OF DOUBLE BONDS (IR): | 60/40/80/20 |

Furthermore, for example, it is noted that U.S. Pat. Nos. 3,836,593, 4,095,033, 3,804,804 and 3,849,509, etc., disclose various processes for preparing the polyoctenamer resins.

It is noted that the polyoctenamer resin to be used in the present invention as a material for sculpturing is a known plastic material, and the unmodified resin alone is relatively brittle in mechanical strength in the case of industrial uses.

Accordingly, the polyoctenamer resins have been used as a carcass of tires, bottom parts of radial tires by mixing with fillers, sealings for bicycles, a profile for assembly in car internal parts, reinforced hoses, etc., by mixing with various other resins after vulcanizing thereof in order to improve mechanical strength.

The polyoctenamer resin in accordance with the present invention is not vulcanized, and has a sufficiently long time capability for modeling (pot life) and ease of sculpturing due to its moderate brittleness compared with conventional materials for modeling and/or sculpturing.

Furthermore, in the case of necessity of even longer pot life, the pot life can preferably be extended by mixing various kinds of resins, e.g., a rubber having low molecular weight.

Softening temperatures of the polyoctenamer resin can also be adjusted by mixing with a polyolefin copoplymers and/or a modified polyolefin resin.

Still further, it is effective in extension of the pot life that a polyoctenamer resin having higher molecular weight is mixed with another polyoctenamer having lower molecular weight.

As described hereinabove, even being mixed with the above-mentioned various additives or the other resins, molded and sculptured articles of polyoctenamer resin composition have a tendency of shrinking after a long period of time.

The present invention is based on the finding that mixing the polyoctenamer resin with a polyolefin copolymer and/or a modified polyolefin resin results in prevention of shrinking of the polyoctenamer resin.

The polyolefin copolymer to be used in the present invention can be prepared by block or graft copolymerization of an olefin monomer such as ethylene or propylene with an other monomer such as acrylic acid, methacrylic acid, an ester of acrylic acid, an ester of methacrylic acid, an unsaturated carboxylic acid or an ester thereof, a carboxylic anhydride and an unsaturated glycidyl compound, etc.

The copolymerization methods of an olefin monomer are described, for example, in Japanese Patent Examined Publications 3254/1977 and 15422/1969, etc.

On the other hand, the modified polyolefin resin to be used in the present invention can be also prepared by blending of an olefin homopolymer such as a polyethylene or polypropylene with a compound for modifying.

The blending method of a polyolefin homopolymer with a compound for modifying is described, for example, in Japanese Patent Examined Publication 39675/1981, etc.

It is noted that the blending process is referreded to as a reactive compounding, in which a polyolefin homopolymer is blended, for example, with maleic anhydride in the presence of a polymerization initiator by an extruder.

A polyolefin copolymer to be used in the present invention includes an ethylene-glycidyl methacrylate copolymer, an ethylene-ethylacrylate copolymer, an ethylene-vinyl acetate copolymer, an ethylene-vinyl alcohol copolymer, an ethylene-ethylacrylate-maleic anhydride copolymer, a propylene-maleic anhydride copolymer, an ethylene-(meth)acrylic acid copolymer, a propylene-(meth)acrylic acid copolymer.

Furthermore, a modified polyolefin resin to be used in the present invention includes a polypropylene modified by maleic anhydride, a polyethylene modified by maleic anhydride, a polypropylene modified by ethyl acrylate, an polyethylene modified by glycidyl methacrylate, an polypropylene modified by glycidyl methacrylate, a polyethylene modified by ethyl acrylate, a polyethylene modified by (meth)acrylic acid and a polypropylene modified by (meth)acrylic acid.

Commercially supplied examples of the polyolefin copolymer or the modified polyolefin resin include, for example, MODIC P-310K which is a polypropylene modified by maleic anhydride, MODIC E-310K which is a polyethylene modified by maleic anhydride (manufactured by Mitsubishi Petro-Chemical, Ltd.), ADMER GF550 which is a modified polypropylene(manufactured by Mitsui Petro-Chemical, Ltd.), REXLON A3100 which is a polyethylene modified by ethyl acrylate (having the substituted degree of ethylene monomer unit of 3.02 mol % and the ethyl acrylate content of 10 wt %: manufactured by Nippon Petrochemicals, Ltd.), BONDFIRST E which is an ethylene-glycidyl methacrylate copolymer (having the glycidyl methacrylate content of 12.3 wt % and weight average molecular weight of 263,000: manufactured by Sumitomo Chemical, Ltd.), TOUGHMER MC 206 which is an ethylene-alpha olefin-maleic anhydride copolymer (manufactured by Mitsui Petro-Chemical, Ltd.), BONDINE AX 8390 which is an ethylene-ethylacrylate-maleic anhydride copolymer (manufactured by Sumitomo Chemical, Ltd.), EVATATE R5011 which is an ethylene-vinyl acetate copolymer (having the substituted degree of ethylene monomer unit of 18.5 mol % and the ethyl vinyl acetate content of 41 wt %: manufactured by Sumitomo Chemical, Ltd.) and EVAFLEX P 2505 which is an ethylene-vinyl acetate copolymer (having the substituted degree of ethylene monomer unit of 9.80 mol % and the ethyl vinyl acetate content of 25 wt %: manufactured by Mitsui Poly-Chemical, Ltd.), etc.

One or more of the copolymer or the modified resin is preferably used.

The polyolefin copolymer or the modified polyolefin resin to be used in the present invention preferably includes other monomer units of from 0.01 to 50 wt % than olefin units, more preferably from 1 to 20 wt % based on the total weight.

FIG. 1 is a chart obtained in measurements with a differential scanning calorimeter (DSC: under the condition of nitrogen gas stream and 10° C./min), in which the curves of melting processes (Perkin-Elmer type) are illustrated with regard to a resin composition composed of the polyoctenamer resin and the ethylene-ethylacrylate copolymer in a mixing ratio of 60/40, a polyoctenamer resin, and an ethylene-ethylacrylate copolymer, respectively.

FIG. 1 clearly illustrates that the polyoctenamer resin composition mixed with an ethylene-ethylacrylate copolymer initiates to melt at a vicinity of room temperatures as well as polyoctenamer resin not mixed, and has a higher melting point than the polyoctenamer resin.

The fact shows that the resin composition has an excellent workability as a sculpturing material at the vicinity of room temperatures as well as the polyoctenamer resin, and the composition has an excellent shape-stability even in higher temperatures, whereas the polyoctenamer resin completely melts.

Figure 2:
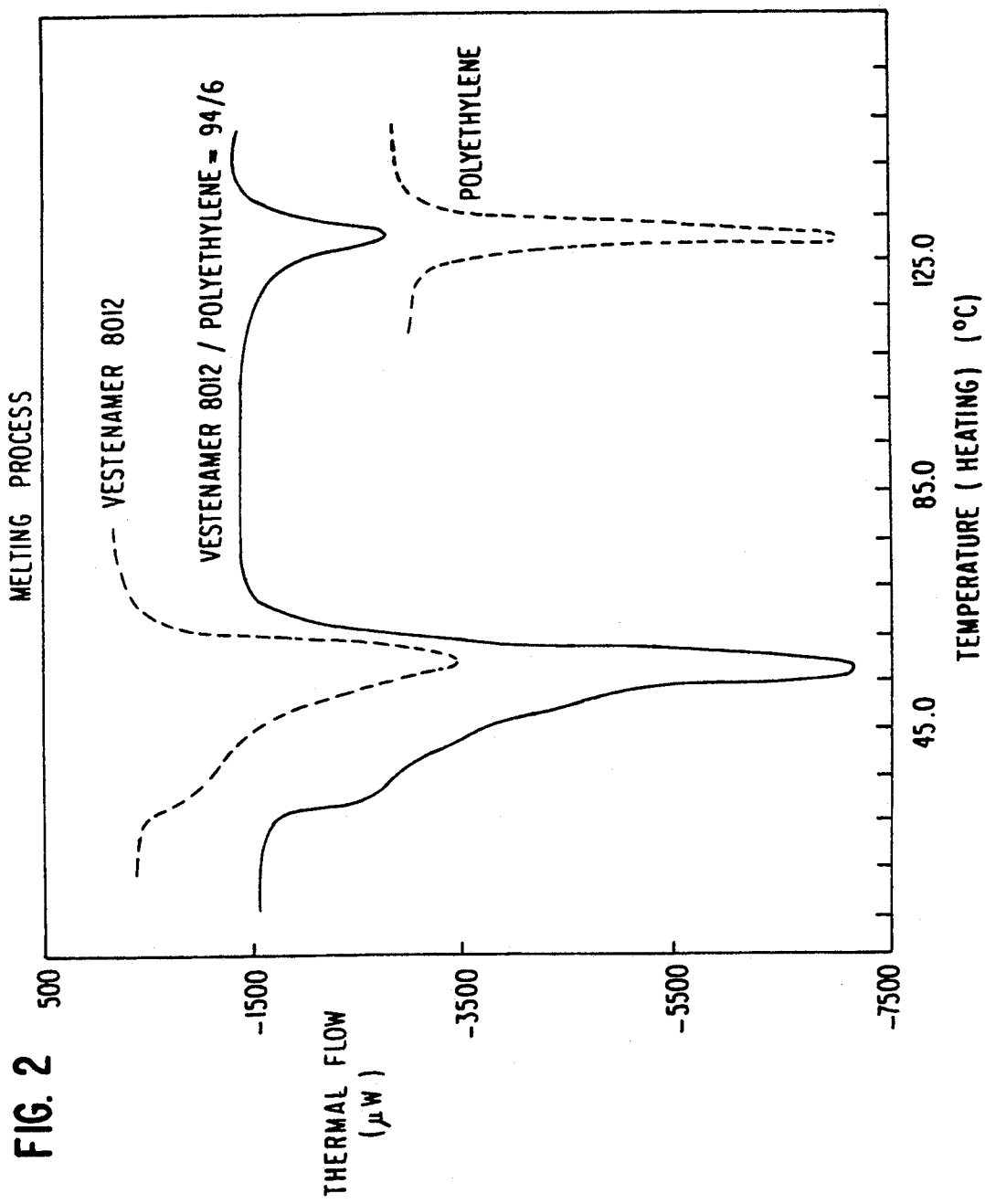
FIG. 2 is another chart obtained in measurements with a differential scanning calorimeter (DSC), in which the thermal flow curves in melting processes (Metler type) are illustrated with regard to a resin composition composed of the polyoctenamer resin and a polyethylene homopolymer in a mixing ratio of 94/6, a polyoctenamer resin, and a polyethylene homopolymer, respectively.

On the other hand, a polyoctenamer resin and a polyolefin homopolymer such as a polyethylene or a polypropylene do not have solubility with each other, as illustrated in FIG. 2 (Metler type curves).

The mixing ratio of the polyoctenamer resin with the polyolefin copolymer and/or the modified polyolefin resin is generally from 98/2 to 10/90, and preferably from 90/10 to 50/50.

Where the mixing ratio of the polyolefin copolymer and/or the modified polyolefin resin is not more than 2, shape-stability can not be improved in a high temperature range.

On the other hand, where it is not less than 90, workability is lost in a low temperature range, resulting in that the mixing itself would become meaningless.

Furthermore, ease of sculpturing or polishing can be improved by mixing an inorganic filler in the polyoctenamer resin composition to be used in the present invention.

As described hereinabove, even the present composition comprising the polyoctenamer resin and a polyolefin copolymer and/or a modified polyolefin resin alone can be readily sculptured with a chisel, etc.

However, a sculpturing resin composition comprising a polyoctenamer resin and a polyolefin copolymer and/or a modified polyolefin resin containing an inorganic filler having high density is even more suitable as a material for sculpturing because of not only being capable of facile sculpturing with a chisel, etc., but also to provide more beautiful surface smoothness and massiveness effect in the case of handling thereof.

It is noted that the polyoctenamer resin alone has a low density, for example, 0.91 in Vestenamer 8012, 0.89 in Vestenamer 6213 and approximately from 0.95 to 1.3 in the polyolefin copolymer or modified polyolefin resin, and results in cheapishness as a sculptured product such as an ornament, etc.

Examples of the inorganic fillers include conventional fillers for plastics, such as zinc oxide, calcium carbonate, titanium dioxide, silica, a powdered glass, a powdered metal, etc.

Zinc oxide is more preferably used, because of excellent surface smoothness in sculptured products such as an ornament, etc.

The content of the fillers is generally from 20 to 90% by weight, and more preferably from 50 to 75% by weight based on the total weight of the composition.

Where the content is less than 20%, the above described advantages are not exhibited.

On the other hand, where the content is more than 90%, the composition is too brittle to be sculptured, resulting in difficulty in shaving or polishing.

It is noted that the polyoctenamer resin to be used in the present invention exhibits emanation of a peculiar odor, which is occasionally disadvantageous, depending upon the uses.

Though the peculiar odor can be more effectively removed by an extraction of low molecular weight components, an addition of various kinds of deodorizers is also very effective and is a convenient method of overcoming the odor.

Specific examples of the deodorizers having remarkable effectiveness include, unlimitedly, an organic compound such as benzaldehyde, glyoxal, formalin, and or peracetic acid, etc.

Commercial products of the very effective deodorizers include ACRYACE (supplied by Ryoto Chemical, Ltd.), RAN-10 and MU-357 (supplied by Tokuyama Soda, Ltd.), etc.

Specific examples of inorganic deodorizers include, unlimitedly, hydrogen peroxide or hypochlorous acid, etc.

Commercial products of very effective inorganic deodorizers include BK-113 (supplied by Sumitomo Alumina, Ltd.), NA-1303 (supplied by Yamajin Sangyo, Ltd.), etc. It is noted that one or more of the deodorizers can be used, and the combined use of the deodorizers tends to be more effective.

The material for sculpturing to be used in the present invention is usually supplied to users in the form of pellet-shaped resin.

Molding methods to prepare an original mold before sculpturing or cutting with a chisel or a boaster, for example, an injection molding machine or a compression molding machine for conventional plastics, can be preferably applied.

In the case of preparing a complicatedly-shaped original mold, for example, the granule-shaped resin can be immersed into warm or hot water to soften it, and then can be freely kneaded and modeled by hand, a trowel, a spatula, etc.

Also, it is preferable that several pieces of small blocks capable of being combined with each other can be prepared to form a roughly-outlined mold before sculpturing, and then the combined blocks can be partially softened to embody with a blowing heater or hot water.

The embodied blocks can also be used as an ornament or a decoration even without sculpturing or shaving.

However, the embodied blocks are preferably sculptured or shaved with a chisel, etc., in order to complete more precisely fine parts thereof.

Furthermore, the finely completed blocks can also be finally polished with a rasp or a sandpaper, etc., in order to close-up the surface smoothness thereof.

Still further, the material for sculpturing can also be colored by mixing pigments or dyes before being embodied and/or sculptured, that is, during preparation of granule-shaped resin as well as having a capability of coloring after being embodied and/or sculptured.

In addition, the material for sculpturing which comprises a polyoctenamer resin can also be mixed with various stabilizers, UV absorbents, plasticizers for conventional resins, and also other thermoplastic resins such as a polyisobutylene, etc.

Mixing with the other thermoplastic resins can improve brittleness of the polyoctenamer resin.

The above-described various additives can be readily added to the polyoctenamer resin with an extruder, and an internal mixer such as Banbury mixer or a roll for rubber processing.

The following Examples serve to give specific illustration of the practice of this invention but they are not intended in any way to act to limit the scope of this invention.

EXAMPLE 1

A plurality of blocks possible to assemble each other were molded from a mixture composed of 80 parts by weight of a polyoctenamer resin (Vestenamer 8012 manufactured by Huels AG in Germany) and 20 parts by weight of an ethylene-ethylacrylate copolymer (Lexlon A 3250 manufactured by Japan Petro-Chemical, Ltd.) with an injection molding machine.

The blocks were assembled to form a model of a roughly-shaped manikin doll, followed by being partially softened with a conventional hair dryer to prepare an original doll model.

The original doll model was partially shaved with a knife to modify fine parts thereof, followed by being polished with a sandpaper to prepare a manikin doll having excellent outer appearance.

The manikin doll was finishingly coated by an acrylic paint to give a further excellent outer appearance.

EXAMPLE 2

The same procedures as described in Example 1 were repeated, except that 100 parts by weight of zinc oxide was further mixed to prepare a heavy-looking manikin doll.

EXAMPLE 3

The same procedures as described in Example 2 were repeated, except that a car-shaped model was prepared in place of the manikin doll model to prepare a model having an excellent outer appearance and being heavy-looking.

The models prepared in Examples 1 to 3 were left in a place where they were exposed to the direct sun during a summer season.

However, no deformation was observed.

COMPARATIVE EXAMPLE 1

The same procedures as described in Example 3 were repeated, except that the ethylene-ethylacylate copolymer was not mixed therewith in preparation of the car-shaped model.

The car-shaped model was left at a place where was exposed to the sunlight through glass, resulting in beginning of deformation after about half day, and completely shrunken deformation after about 3 days.

It appears that there was caused a relaxation of residual strain which was generated in the preparation of the model because of raising to the temperatures over the melting point of the polyoctenamer.

EXAMPLE 4

The same procedures as described in Example 1 were repeated, except that a polypropylene modified by maleic anhydride (MODIC P-310K manufactured by Mitsubishi Petro-Chemical, Ltd.) was used in place of the ethylene-ethylacrylate copolymer, to prepare a manikin doll having an excellent outer appearance and good paintability.

COMPARATIVE EXAMPLE 2

The same procedures as described in Example 1 were repeated, except that a polycaprolactone resin (PCL-H5 manufactured by Daicel Chemical Industries, Ltd.) having a relative viscosity of 2.34 was used in place of the polyoctenamer resin to prepare a manikin doll model.

The model was too rigid to shave with a knife, resulting in inferior workability. Furthermore, the outer appearance was spoiled by trying to polish with a sandpaper to finish up the surface.

COMPARATIVE EXAMPLE 3

The same procedures as described in Example 3 were repeated, except that a polyethylene homopolymer (Hizex 2100J manufactured by Mitsui Petro-Chemical Industries, Ltd.) was used in place of the ethylene-ethylacrylate copolymer, with the mixing ratio of 94/6, to prepare a car-shaped model.

The model was left at a place where it was exposed to sunlight through glass during a summer season, resulting in completely shrunken deformation after about 3 days, similarly to Comparative Example 1.

It appears that the polyoctenamer resin and the polyethylene homopolymer do not have solubility each other, and shape-stability of the polyoctenamer resin is not improved in a high temperature range even though being mixed with the polyethylene homopolymer, as illustrated in FIG. 2.

While the invention has been described in detail and with reference to specific embodiments thereof, it will be apparent to one skilled in the art that various changes and modifications can be made therein without departing from a spirit and scope thereof.

What is claimed is:

1. A sculpturing composition comprising a resin composition containing a polyoctenamer resin having molecular weight of from 10,000 to 150,000 as measured by Gel Permeation Chromatography and at least one of a polyolefin copolymer selected from the group consisting of an ethylene-glycidyl methacrylate copolymer, an ethylene-ethylacrylate copolymer, an ethylene-vinyl acetate copolymer, an ethylene-vinyl alcohol copolymer, an ethylene-ethylacrylate-maleic anhydride copolymer, a propylene-maleic anhydride copolymer, an ethylene-(meth)acrylic acid copolymer, a propylene-(meth)acrylic acid copolymer, and a modified polyolefin resin selected from the group consisting of a polypropylene modified by maleic anhydride, a polyethylene modified by maleic anhydride, a polypropylene modified by ethyl acrylate, a polyethylene modified by glycidyl methacrylate, a polypropylene modified by glycidyl methacrylate, a polyethylene modified by ethyl acrylate, a polyethylene modified by (meth)acrylic acid and a polypropylene modified by (meth)acrylic acid, wherein the mixing ratio of polyoctenamer resin with the polyolefin copolymer and the modified polyolefin resin is 98/2 to 10/90.

2. A composition as set forth in claim 1, wherein said polyolefin copolymer is an ethylene-ethylacrylate copolymer.

3. A composition as set forth in claim 1, wherein said polyolefin copolymer is an ethylene-vinyl acetate copolymer.

4. A composition as set forth in claim 1, wherein said polyolefin copolymer is an ethylene-glycidyl methacrylate copolymer.

5. A composition as set forth in claim 1, wherein said modified polyolefin resin is a polypropylene modified by maleic anhydride.

6. A composition as set forth in claim 1, wherein said resin composition contains an inorganic filler.

7. A composition as set forth in claim 6, wherein said resin composition contains zinc oxide as an inorganic filler.

8. A composition as set forth in claim 6, wherein the content of said inorganic filler is from 50 to 75% by weight based on the total weight.

9. A composition as set forth in claim 1, wherein the mixing ratio of said polyoctenamer resin with respect to said polyolefin copolymer and said modified polyolefin resin is from 90/10 to 50/50.

10. A composition as set forth in claim 1, wherein said polyoctanamer resin is an admixture composed of two kinds of polyoctenamer resins.

11. A composition as set forth in claim 1, wherein said polyoctenamer resin has the molecular weight of from 80,000 to 120,000 as measured by Gel Permeation Chromatography.

12. A composition as set forth in claim 1, wherein said resin composition contains a deodorizers.

13. A composition as set forth in claim 1, wherein said resin composition contains a dye or a pigment for coloring.

14. In a process for manufacturing a sculptured product comprising sculpturing a sculpturing material composition, the improvement comprising using as the sculpturing material composition of claim 1.

* * * * *